United States Patent
Kwon

(10) Patent No.: US 9,751,419 B2
(45) Date of Patent: Sep. 5, 2017

(54) VEHICLE WIRELESS CHARGING GUIDANCE SYSTEM AND METHOD

(71) Applicant: HYUNDAI MOBIS Co., Ltd., Yongin-si, Gyeonggi-do (KR)

(72) Inventor: Young In Kwon, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 77 days.

(21) Appl. No.: 14/937,560

(22) Filed: Nov. 10, 2015

(65) Prior Publication Data

US 2016/0129799 A1   May 12, 2016

(30) Foreign Application Priority Data

Nov. 10, 2014 (KR) .................. 10-2014-0155417

(51) Int. Cl.
*B60L 11/18* (2006.01)
(52) U.S. Cl.
CPC ......... *B60L 11/1829* (2013.01); *B60L 11/182* (2013.01); *B60L 11/1833* (2013.01); *Y02T 10/7005* (2013.01); *Y02T 90/163* (2013.01)
(58) Field of Classification Search
CPC .. B60L 11/1829; B60L 11/182; B60L 11/1833
USPC ....................................................... 320/108
See application file for complete search history.

(56) References Cited

U.S. PATENT DOCUMENTS

| 5,869,910 | A | * | 2/1999 | Colens ................ | G05D 1/0265 |
| | | | | | 307/104 |
| 8,423,223 | B2 | * | 4/2013 | Nakamura et al. ... | B60L 11/123 |
| | | | | | 340/932.2 |
| 2008/0266137 | A1 | * | 10/2008 | Son .................... | B62D 15/0275 |
| | | | | | 340/932.2 |
| 2014/0191586 | A1 | * | 7/2014 | Ichikawa ............... | H01F 38/14 |
| | | | | | 307/104 |
| 2016/0033288 | A1 | * | 2/2016 | Ueda ................... | B60L 11/1809 |
| | | | | | 701/302 |
| 2016/0089989 | A1 | * | 3/2016 | Park ..................... | B60L 11/182 |
| | | | | | 320/108 |

* cited by examiner

*Primary Examiner* — Sun Lin
(74) *Attorney, Agent, or Firm* — Paratus Law Group, PLLC

(57) ABSTRACT

A vehicle wireless charging guidance system and method are provided. The system includes a power transmission module, which is installed in a charging station and configured to receive a voltage and switch a transmission coil, a power reception module, which is installed in a vehicle and configured to switch energy transmitted from the power transmission module so as to correspond to a battery arranged in the vehicle, and an around view monitoring unit, which is arranged in the vehicle and configured to receive position information of the power transmission module form the power transmission module and position information of the power reception module from the power reception module, and display the received position information of the power transmission module and the received position information of the power reception module and image information around the vehicle.

10 Claims, 7 Drawing Sheets

VEHICLE WIRELESS CHARGING GUIDANCE SYSTEM AND METHOD

CROSS-REFERENCE TO RELATED APPLICATION

This application claims priority to and the benefit of Korean Patent Application No. 10-2014-0155417, filed on Nov. 10, 2014, the disclosure of which is incorporated herein by reference in its entirety.

BACKGROUND

1. Field of the Invention

The present invention relates to a system and method for guiding a vehicle to a target movement position when charging a vehicle by wireless.

2. Discussion of Related Art

Vehicle wireless charging technology relates to technology of transferring primary energy to secondary energy through a resonance using transmission and reception coils, and charging a high voltage battery of a vehicle by switching to be suitable for the high voltage battery.

This has been proposed in Society of Automotive Engineers (SAE) J2954 (title: Wireless charging of electric and plug-in hybrid vehicles and positioning communication).

However, wireless charging technology of a non-contact method according to a conventional art has a problem in which it is difficult to secure wireless charging efficiency when a vehicle is not parked so that a transmission unit and a reception unit are approached since the charging efficiency is influenced by positions of the transmission unit and the reception unit according to the vehicle parking.

SUMMARY OF THE INVENTION

The present invention is directed to a vehicle wireless charging guidance system and method capable of increasing wireless charging efficiency by allowing a vehicle to be parked so that positions of a power transmission module and a power reception module are approached by displaying position information of the power transmission module and the power reception module on an around view monitoring (AVM) screen in real time.

According to one aspect of the present invention, there is provided a vehicle wireless charging guidance system including: a power transmission module configured to receive a voltage and switch a transmission coil; a power reception module configured to switch energy transmitted from the power transmission module so as to correspond to a battery arranged in a vehicle; and an around view monitoring unit configured to receive position information from the power transmission module and the power reception module, and display the received position information and image information around the vehicle.

According to another aspect of the present invention, there is provided a vehicle wireless charging guidance method including: (a) obtaining position information of a power transmission module receiving a voltage and switching a transmission coil, and position information of a power reception module receiving energy from the power transmission module; (b) obtaining image information around a vehicle according to movement of the vehicle, and obtaining around view information; and (c) displaying the position information of the power transmission module and the power reception module, and the around view information.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims.

Meanwhile, the terminology used herein to describe exemplary embodiments of the invention is not intended to limit the scope of the invention. In this specification, the articles "a," "an," and "the" are singular in that they have a single referent, but the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Figure 1:
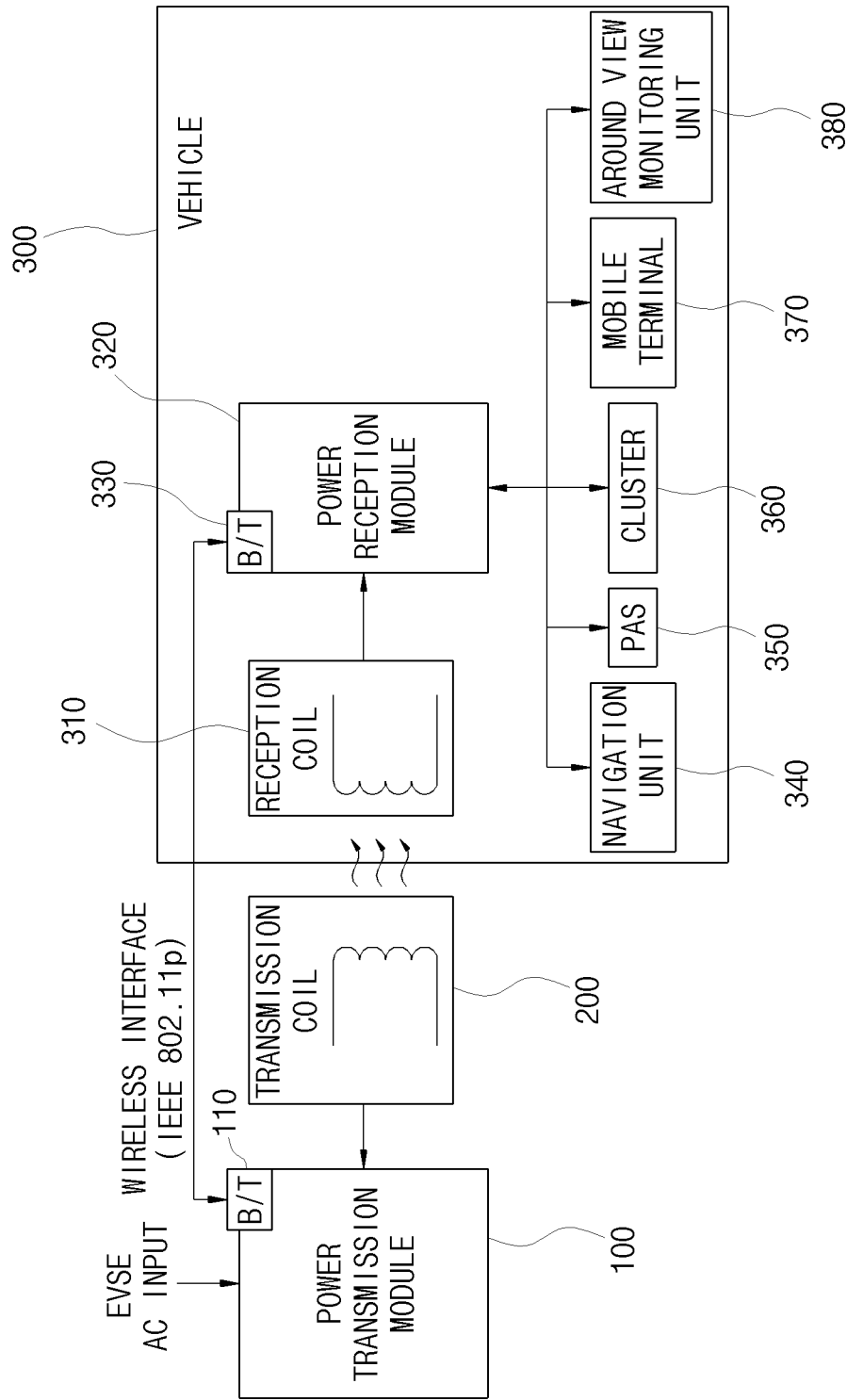
FIG. 1 is a block diagram illustrating a vehicle wireless charging guidance system according to an embodiment of the present invention.

FIG. 1 is a block diagram illustrating a vehicle wireless charging guidance system according to an embodiment of the present invention. A vehicle wireless charging guidance system according to an embodiment of the present invention may include a power transmission module 100 receiving a voltage and switching a transmission coil 200, a power reception module 320 including a reception coil 310 resonating with the transmission coil 200 and switching the reception coil 310 so that energy transferred from the power transmission module 100 corresponds to a battery arranged in a vehicle 300, and an around view monitoring unit 380 receiving position information from the power transmission module 100 and the power reception module 320, and displaying the received position information and image information around the vehicle.

A Bluetooth module 110 arranged in the power transmission module 100 and a Bluetooth module 330 arranged in the power reception module 320 may communicate with each other through an IEEE 802.11p wireless interface.

The power transmission module 100 according to an embodiment of the present invention may transmit wireless communication state information, charging state information, and power transmission module position information to the power reception module 320.

The power transmission module 100 and the power reception module 320 may perform wireless charging start and completion operations through information exchange between the power transmission module 100 installed in a road or a parking lot and the power reception module 320 installed in a lower portion of the vehicle. A wireless protocol from the power transmission module 100 to the power reception module 320 may be defined by the following [Table 1] and [Table 2].

TABLE 1

| ID | DATA | PERIOD | DATA BYTE | DATA BIT | STATE VALUE | FROM | TO | DESCRIPTION |
|---|---|---|---|---|---|---|---|---|
| XX1 | CF_COMMUCATION_SET | 100 ms | 0 | 0 | 1 | TRANS-MISSION MODULE | RECEPTION MODULE | Communication state set-up (Communication start) |
|  | CF_POLLING STATE | 100 ms |  | 1 | 1 |  |  | Periodical reception module state monitoring message |
|  | CR_ID_CHK | 100 ms | 2 | 16 | ABCDE |  |  | ID confirmation message |
|  | CR_CHARGER_NUM_CHK | 100 ms | 4 | 32 | 1234 |  |  | Charger number confirmation message |
|  | CR_CUR_FAULT_CHK | 100 ms | 6 | 48 | 1011 |  |  | Current fault information confirmation message |
|  | CAR_NUM | 1 s | 7 | 56 | 0~255 |  |  | Vehicle ID number |
| XX2 | CF_CONTROL_START | 100 ms | 0 | 0 | 1 | TRANS-MISSION MODULE | RECEPTION MODULE | Wireless charging start |
|  | CR_TX_STATE | 100 ms | 1 | 8 | 0~4 |  |  | 0: Normal 1: Abnormal 2: Standby 3: Power transmission 4: Transmission module state value transmission |
|  | CR_RX_STATE | 100 ms | 2 | 16 | 0~4 |  |  | 0: Normal 1: Abnormal 2: Standby 3: Power transmission 4: Transmission module state value transmission |
|  | CR_TX_FAULT | 100 ms | 4 | 32 | 1111 |  |  | Transmission module fault state message |
|  | CR_RX_FAULT | 100 ms | 6 | 48 | 1011 |  |  | Reception module fault state message |

TABLE 2

| ID | DATA | PERIOD | DATA BYTE | DATA BIT | STATE VALUE | FROM | TO | DESCRIPTION |
|---|---|---|---|---|---|---|---|---|
| XX3 | BMS_INFO_REQ | 100 ms | 0 | 0 | 1 | TRANS-MISSION MODULE | RECEPTION MODULE | BMS information request |
|  | BMS_INFO_RESP_ACK | 100 ms | 1 | 8 | 1 |  |  | BMS information normal response message |
|  | BMS_INFO_RESP_NAK | 100 ms |  | 9 | 1 |  |  | BMS information abnormal response message |
|  | RX_CHAR_INFO_REQ | 100 ms | 2 | 16 | 1 |  |  | Reception module information request |
|  | RX_CHAR_INFO_RESP_ACK | 100 ms | 3 | 24 | 1 |  |  | Reception module information normal response message |
|  | RX_CHAR_INFO_RESP_NAK | 100 ms |  | 25 | 1 |  |  | Reception module information abnormal response message |
| XX4 | CR_TX_AC_VOL | 100 ms | 0 | 0 | 0~500 | TRANS-MISSION MODULE | RECEPTION MODULE | Transmission module input voltage |
|  | CR_TX_AC_CUR | 100 ms | 1 | 8 | 0~50 |  |  | Transmission module input current |
|  | CR_TX_PSFB_IN_CUR | 100 ms | 2 | 16 | 0~50 |  |  | Transmission module full bridge input voltage |
|  | CR_TX_PSFB_IN_VOL | 100 ms | 3 | 24 | 0~500 |  |  | Transmission module full bridge input current |
|  | CR_TX_TEMP | 100 ms | 5 | 40 | −40~150 |  |  | Transmission module temperature |

The power transmission module 100 may confirm a state through a packet Internet grouper (PING) between the power transmission module 100 and the power reception module 320, and share information. XX1 is a data classification including a wireless state between the power transmission module and the power reception module, identification (ID), vehicle information, etc., and XX2 is a data classification including charging start and state information. XX3 is a data classification including battery management system (BMS) and reception module related information request, and XX4 is a data classification of providing information related to an input voltage, an input current, and a temperature, etc. of the power transmission module to the power reception module.

A wireless protocol from the power reception module 320 to the power transmission module 100 may be defined by the following [Table 3] and [Table 4].

The power reception module 320 may provide information related to a vehicle state, and operate according to a wireless interface definition of the power transmission module and the power reception module.

XX1 is a data classification including a wireless state between the power transmission module and the power reception module, and each state information, XX2 is a data classification providing BMS information, XX3 is a data classification including an output voltage message, an output current message, and a temperature message of the power reception module, and XX4 is a data classification including vehicle information and ID, and a current fault information confirmation message.

An interface between the power reception module 320 and a BMS 390 may be defined by the following [Table 5] and [Table 6].

TABLE 3

| ID | DATA | PERIOD | DATA BYTE | DATA BIT | STATE VALUE | FROM | TO | DESCRIPTION |
|---|---|---|---|---|---|---|---|---|
| XX1 | CF_CONTROLLABLE | 100 ms | 0 | 0 | 1 | TRANS-MISSION MODULE | RECEP-TION MODULE | Wireless charging start possibility state information message |
|  | CF_COMMUNICATION_OK |  |  | 1 | 1 |  |  | Communication state normal |
|  | CF_RESP_ACK |  |  | 2 | 1 |  |  | Normal response message |
|  | CF_RESP_NAK |  |  | 3 | 1 |  |  | Abnormal response message |
|  | CR_TX_STATE |  | 1 | 8 | 0~4 |  |  | 0: Normal 1: Abnormal 2: Standby 3: Power transmission 4: Transmission module state value transmission |
|  | CR_RX_STATE |  | 2 | 16 | 0~4 |  |  | 0: Normal 1: Abnormal 2: Standby 3: Power transmission 4: Transmission module state value transmission |
|  | CR_TX_FAULT |  | 4 | 32 | 1111 |  |  | Transmission module fault state message |
|  | CR_RX_FAULT |  | 6 | 48 | 1011 |  |  | Reception module fault state message |
| XX2 | BMS_CUR_INFO | 100 ms | 0 | 8 | 0~20 | TRANS-MISSION MODULE | RECEP-TION MODULE | BMS control current message |
|  | BMS_VOL_INFO |  | 2 | 16 | 0~500 |  |  | BMS control voltage message |
|  | BMS_FAULT_STATE |  | 4 | 32 | 1011 |  |  | BMS fault information message |
|  | BMS_TEMP |  | 6 | 48 | −40~150 |  |  | BMS temperature message |

TABLE 4

| ID | DATA | PERIOD | DATA BYTE | DATA BIT | STATE VALUE | FROM | TO | DESCRIPTION |
|---|---|---|---|---|---|---|---|---|
| XX3 | CR_RX_DC_VOL | 100 ms | 1 | 8 | 0~500 | TRANS-MISSION MODULE | RECEP-TION MODULE | Reception module output voltage message |
|  | CR_RX_DE_CUR |  | 2 | 16 | 0~50 |  |  | Reception module output current message |
|  | CR_RX_TEMP |  | 4 | 8 | −40~150 |  |  | Reception module temperature message |
| XX4 | CR_ID_CHK | 100 ms | 2 | 16 | ABCDE | TRANS-MISSION MODULE | RECEP-TION MODULE | ID confirmation message |
|  | CR_CHARGER_NUM_CHK | 100 ms | 4 | 32 | 1234 |  |  | Charger number confirmation message |
|  | CR_CUR_FAULT_CHK | 100 ms | 6 | 48 | 1011 |  |  | Current fault information confirmation message |
|  | CAR_NUM | 1 s | 7 | 56 | 0~255 |  |  | Vehicle ID number |

TABLE 5

| ID | DATA | PERIOD | DATA BYTE | DATA BIT | STATE VALUE | FROM | TO | DESCRIPTION |
|---|---|---|---|---|---|---|---|---|
| XX5 | CF_OBC_Rdy | 100 ms | 0 | 0 | 1 | RECEPTION MODULE | BMS | Ready (CAN communication inside charger, control board ready command) |
| | CF_OBC_Wrn | | | 1 | 1 | | | setting when fault state is generated besides OBC fault |
| | CF_OBC_Flt | | | 2 | 1 | | | Fault (Setting when OBC fault state is generated) |
| | CF_OBC_CharMode | | | 3 4 | 3 | | | Charging mode (CC/CV/CP) |
| | CF_OBC_Connection | | | 5 | 1 | | | Charging connector connection state |
| | CF_OBC_ChgFinished | | | 6 | 1 | | | Charging completion (Value: 1 completion) |
| | CF_OBC_PowEnaStat | | | 7 | 1 | | | Charging possibility ready state alarm |
| | CR_OBC_FltCode | | 1 | 8 | 0~225 | | | Charger error code (Diagnosis communication code) |
| | CR_OBC_Temp | | 2 | 16 | −40~200° C. | | | Charger inner temperature |
| | CR_OBC_Effi | | 3 | 24 | 0~100% | | | Charger efficiency |
| | CR_OBC_MaxPwr_W | | 4 | 32 | 50 kw Criteria | | | Maximum chargeable power value |
| | CR_OBC_MaxCur_A | | 5 | 40 | 0~150 A | | | Maximum chargeable current value |
| | CR_OBC_MaxVolt_V | | 6 7 | 48 56 | 0~1000 V | | | Maximum chargeable voltage value |

TABLE 6

| ID | DATA | PERIOD | DATA BYTE | DATA BIT | STATE VALUE | FROM | TO | DESCRIPTION |
|---|---|---|---|---|---|---|---|---|
| XX6 | CF_BMS_RdyForOBC | 100 ms | 0 | 0 | 1 | BMS | RECEPTION MODULE | Ready (CAN communication inside charger, control board ready command) |
| | CF_BMS_WrnForOBC | | | 1 | 1 | | | Warning (Setting when fault state is generated besides BMS fault) |
| | CF_BMS_FaultForOBC | | | 2 | 1 | | | Fault (Setting when charging impossibility fault is generated) |
| | CF_BMS_MainRlyOnStatForOBC | | | 3 | 1 | | | High voltage relay on/off state when charging |
| | CF_BMS_PwrLmtForOBC | | | 4 5 | 3 | | | Charging power limitation |
| | CF_BMS_AbnorChg | | | 6 | 1 | | | Charging state (0: Normal, 1: Abnormal) |
| | CF_BMS_OBCChgFinishedForOBC | | | 7 | 1 | | | Charging completion state |
| | CR_BMS_SoForOBC_Pc | | 1 | 8 | 5~90% | | | Battery SOC(%) |
| | CR_BMS_CharRemained Time_min | | 2 3 | 16 24 | 0~600 min | | | Remaining charging time (remaining time for full charging) |
| | CR_BMS_OBCCmdCur_A | | 4 5 | 32 40 | 0~150 A | | | CC mode constant current value |
| | CR_BMS_OBCCmdVolt_V | | 6 7 | 48 56 | 0~1000 V | | | CV mode constant voltage value |

The power reception module 320 may provide each state information (fault state related information, charging completion information, maximum chargeable power, current, and voltage values, etc.) according to a command of the BMS 390, and suspend an operation when a fault is generated. XX5 is a data classification including power reception module inner state information and each state information for a charging start.

The BMS 390 may provide charging command information according to a state of a high voltage battery of the vehicle, and induce a stable charging operation. XX6 may provide BMS inner state information, each state information for a charging start, and charging current and voltage information.

The vehicle wireless charging guidance system according to an embodiment of the present invention may display charging state information received from the power reception module 320, and include a navigation unit 340 displaying a charging power setting tap.

An interface between the power reception module 320 and the navigation unit 340 may be defined by the following [Table 7] and [Table 8].

TABLE 7

| ID | DATA | PERIOD | DATA BYTE | DATA BIT | STATE VALUE | FROM | TO | DESCRIPTION |
|---|---|---|---|---|---|---|---|---|
| XX7 | CF_RXWPT_RdyForOBC | 100 ms | 0 | 0 | 1 | RECEPTION MODULE | NAVIGATION UNIT | Reception module Ready state (CAN communication inside charger, control board ready) |
|  | CF_RXWPT_Charging |  |  | 1 | 1 |  |  | Charging display |
|  | CF_RXWPT_Finish |  |  | 2 | 1 |  |  | Charging completion display |
|  | CR_BMS_SoForOBC_Pc |  | 1 | 8 | 5~90% |  |  | Charging amount display |

TABLE 8

| ID | DATA | PERIOD | DATA BYTE | DATA BIT | STATE VALUE | FROM | TO | DESCRIPTION |
|---|---|---|---|---|---|---|---|---|
| XX8 | CF_Navi_Rdy | 100 ms | 0 | 0 | 1 | NAVIGATION UNIT | RECEPTION MODULE | Navigation unit Ready state |
|  | CF_Navi_ChgStart |  |  | 1 | 1 |  |  | Charging start button |
|  | CF_Navi_ChgFinished |  |  | 2 | 1 |  |  | Charging completion button |
|  | CF_Navi_PAS_LocMatch_Start |  |  | 3 | 1 |  |  | PAS position correction start |
|  | CF_Navi_PAS_LocMatch_End |  |  | 4 | 1 |  |  | PAS position correction completion |
|  | CR_WPT_Chr_Time |  | 1 | 8 | 0~600 min |  |  | Charging time setting |
|  |  |  | 2 | 16 |  |  |  |  |
|  | CR_WPT_Chr_Power |  | 3 | 24 | 0~10 kw |  |  | Charging power setting |
|  |  |  | 4 | 32 |  |  |  |  |

The interface between the power reception module 320 and the navigation unit 340 may provide a user interface for starting the charging when the vehicle arrives at a parking lot or a facility capable of charging wirelessly. That is, the charging mode may be set on the screen of the navigation unit 340, the vehicle is positioned in a correct position when a charging button is input, and the interface between the power transmission module 100 and the power reception module 320 may be started.

XX7 is power reception module information, and is a data classification including information related to state display, charging, charging completion, and a charging amount, and XX8 is navigation information, and provides charging start and completion information, PAS operation start and completion information, and charging start and power setting information.

Figure 2:
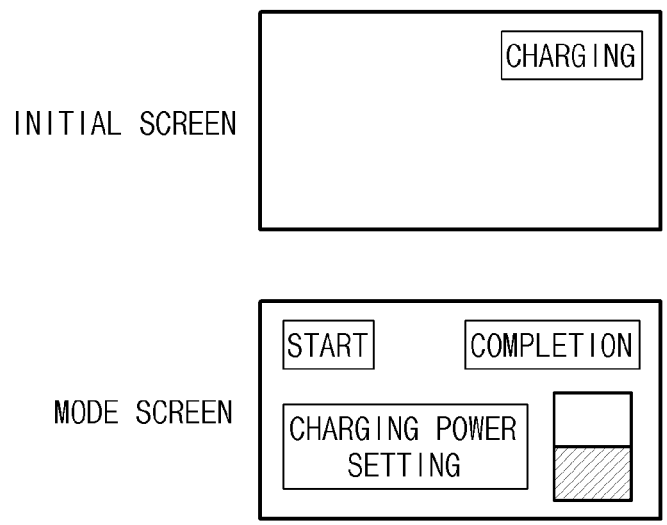
FIG. 2 is a diagram illustrating an example of a screen of a navigation unit according to an embodiment of the present invention.

FIG. 2 is a diagram illustrating an example of a screen of the navigation unit 340 according to an embodiment of the present invention. A charging tap is provided on an initial screen, and when an input with respect to a charging tap is performed, a tap related to start, completion, charging power setting, and charging amount information may be displayed as a mode screen.

The vehicle wireless charging guidance system according to an embodiment of the present invention may include a parking assistance system (PAS) 350 moving the vehicle so that the power reception module 320 arranged in the vehicle corresponds to the power transmission module 100 using the position information of the power transmission module 100 when the charging command signal is received.

An interface between the power reception module 320 and the PAS 350 may be defined by the following [Table 9] and [Table 10].

TABLE 9

| ID | DATA | PERIOD | DATA BYTE | DATA BIT | STATE VALUE | FROM | TO | DESCRIPTION |
|---|---|---|---|---|---|---|---|---|
| XX9 | CF_RXWPT_RdyForOBC | 100 ms | 0 | 0 | 1 | RECEPTION MODULE | PAS | Reception module Ready state (CAN communication inside charger, control board ready) |
|  | CF_RXWPT_Charging |  |  | 1 | 1 |  |  | Charging display |
|  | CF_RXWPT_Finish |  |  | 2 | 1 |  |  | Charging completion display |
|  | CR_RXWPT_Matching_1 |  | 1 | 8 | 0~50 cm |  |  | Vehicle position coordinate correction (front) |
|  | CR_RXWPT_Matching_2 |  | 2 | 16 | 0~50 cm |  |  | Vehicle position coordinate correction (rear) |
|  | CR_RXWPT_Matching_3 |  | 3 | 24 | 0~50 cm |  |  | Vehicle position coordinate correction (left) |
|  | CR_RXWPT_Matching_4 |  | 4 | 32 | 0~50 cm |  |  | Vehicle position coordinate correction (right) |
|  | CR_Matching_info |  | 5 | 40 | 3 |  |  | Vehicle movement ok/nok/re-movement |

TABLE 10

| ID | DATA | PERIOD | DATA BYTE | DATA BIT | STATE VALUE | FROM | TO | DESCRIPTION |
|---|---|---|---|---|---|---|---|---|
| XXA | CF_PAS_Rdy | 100 ms | 0 | 0 | 1 | PAS | RECEPTION MODULE | PAS Ready state information |
| | CF_PAS_ChgStart | | | 1 | 1 | | | Charging start information |
| | CF_PAS_ChgFinished | | | 2 | 1 | | | Charging completion information |
| | CR_PAS_LOC_Req | | | 3 | 1 | | | Movement coordinate information request |
| | CF_PAS_LocMatch_Start | | | 4 | 1 | | | Vehicle movement start |
| | CF_PAS_LocMatch_End | | | 5 | 1 | | | Vehicle movement suspension |

The vehicle wireless charging guidance system according to an embodiment of the present invention may confirm state information by initiating the PAS interface when the charging button is input, move the vehicle using front, rear, left, and right position data of the vehicle, and suspend the movement of the vehicle after confirming the movement state of the vehicle.

An interface between the power reception module 320 and a cluster 360 according to an embodiment of the present invention may be defined by the following [Table 11].

The power reception module 320 and a mobile terminal 370 may perform the wireless charging start and completion operations through the interface, and the mobile terminal 370 may display a charging amount, and a remaining charging time, and inform a driver of the information so as to confirm the charging state anywhere.

Further, when a fault state such as a charging impossibility is generated, a damage of the vehicle may be minimized

TABLE 11

| ID | DATA | PERIOD | DATA BYTE | DATA BIT | STATE VALUE | FROM | TO | DESCRIPTION |
|---|---|---|---|---|---|---|---|---|
| XXB | CF_RXWPT_Charging | 100 ms | 0 | 0 | 1 | RECEPTION MODULE | CLUSTER | Charging display |
| | CF_RXWPT_Finish | | | 1 | 1 | | | Charging completion display |

A light emitting diode (LED) arranged in the cluster 360 may display information related to the charging or completion of the vehicle, inform a user of a current state. XXB is information of the power reception module, and is a data classification including charging information, and charging completion information.

since the charging operation may be suspended through the mobile terminal 370.

An interface between the power reception module 320 and the mobile terminal 370 may be defined by the following [Table 12].

TABLE 12

| ID | DATA | PERIOD | DATA BYTE | DATA BIT | STATE VALUE | FROM | TO | DESCRIPTION |
|---|---|---|---|---|---|---|---|---|
| XXC | CF_RXWPT_RdyForOBC | 100 ms | 0 | 0 | 1 | RECEPTION MODULE | MOBILE TERMINAL | Reception module Ready state (CAN communication inside Charger, control board ready) |
| | CF_RXWPT_Charging | | | 1 | 1 | | | Charging display |
| | CF_RXWPT_Finish | | | 2 | 1 | | | Charging completion display |
| | CF_BMS_FaultForOBC | | | 3 | 1 | | | Fault(Setting when charging impossibility fault state is generated) |
| | CR_BMS_SoForOBC_Pc | | 1 | 8 | 5~90% | | | Charging amount display |
| | CR_BMS_CharRemained Time_min | | 2 3 | 16 24 | 0~600 min | | | Remaining charging time (remaining time for full charging) |
| | CF_MOBILE_Rdy | 100 ms | 0 | 0 | 1 | MOBILE TERMINAL | RECEPTION MODULE | Mobile terminal Ready state information |
| XXD | CF_MOBILE_ChgStart | | | 1 | 1 | | | Charging start button |
| | CF_MOBILE_ChgFinished | | | 2 | 1 | | | Charging completion button |
| | CF_Navi_PAS_LocMatch_Start | | | 3 | 1 | | | PAS position correction start |
| | CF_Navi_PAS_LocMatch_End | | | 4 | 1 | | | PAS position correction completion |
| | CR_WPT_Chr_Time | | 1 | 8 | 0~600 min | | | Charging time setting |
| | CR_WPT_Chr_Power | | 2 3 4 | 16 24 32 | 0~10 kw | | | Charging power setting |

Figure 3:
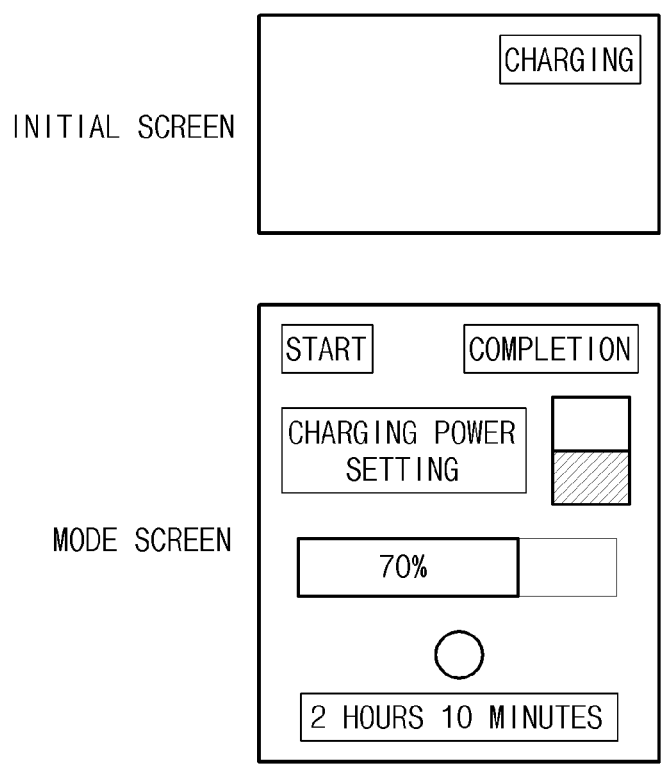
FIG. 3 is a diagram illustrating an example of a screen of a mobile terminal according to an embodiment of the present invention.

XXC is power reception module information, and is a data classification providing charging state display, charging amount display, remaining charging time display, and charging impossibility fault state display, and XXD is mobile terminal information, and is a data classification including charging start and completion information, and information related to a charging time and a power setting. FIG. 3 is a diagram illustrating an example of a screen of a mobile terminal according to an embodiment of the present invention, and a user may start the charging by inputting a vehicle wireless charging tap on the initial screen, set charging power on the mode screen, and inform the user of an alarm by illuminating the LED when the charging impossibility fault state is generated through the LED located in the left of the remaining time (2 hours 10 minutes).

The around view monitoring unit 380 according to an embodiment of the present invention may display image information around the vehicle obtained by a camera sensor arranged in the vehicle 300 according to the movement of the vehicle, and position information of the power transmission module 100 and the power reception module 320, and display a completion message when a matching degree of the power transmission module 100 and the power reception module 320 is equal to or more than a predetermined value.

The around view monitoring unit 380 may display charging amount information of the battery, estimated charging efficiency information, estimated charging time information transmitted from the power reception module 320.

That is, according to an embodiment of the present invention, since it is possible to confirm positions of the power transmission module 100 and the power reception module 320 of a wireless charger when parking the vehicle through the around view monitoring unit 380, parking convenience of the driver may be increased by maximizing the efficiency of the wireless charging.

An interface between the power reception module 320 and the around view monitoring unit 380 may be defined by the following [Table 13].

charging power transmission/reception modules. Further, it may be possible to find the estimated charging efficiency intuitively through the estimated charging efficiency display tap located in the left of the estimated remaining charging time display (2 hours 10 minutes).

Figure 5:
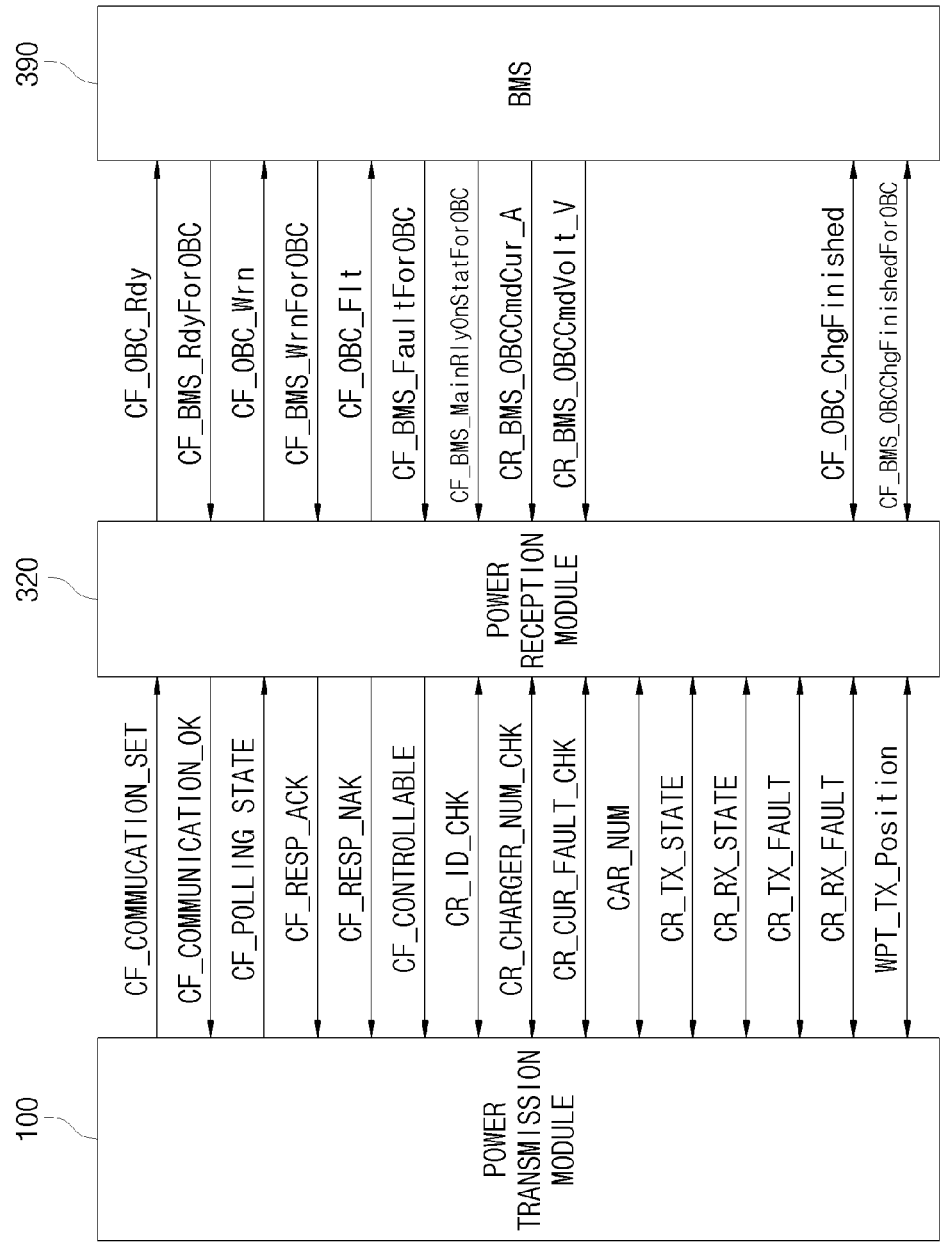
FIG. 5 is a conceptual diagram illustrating a handshaking operation of a power transmission module, a power reception module, and a battery management system (BMS) according to an embodiment of the present invention.
Figure 6:
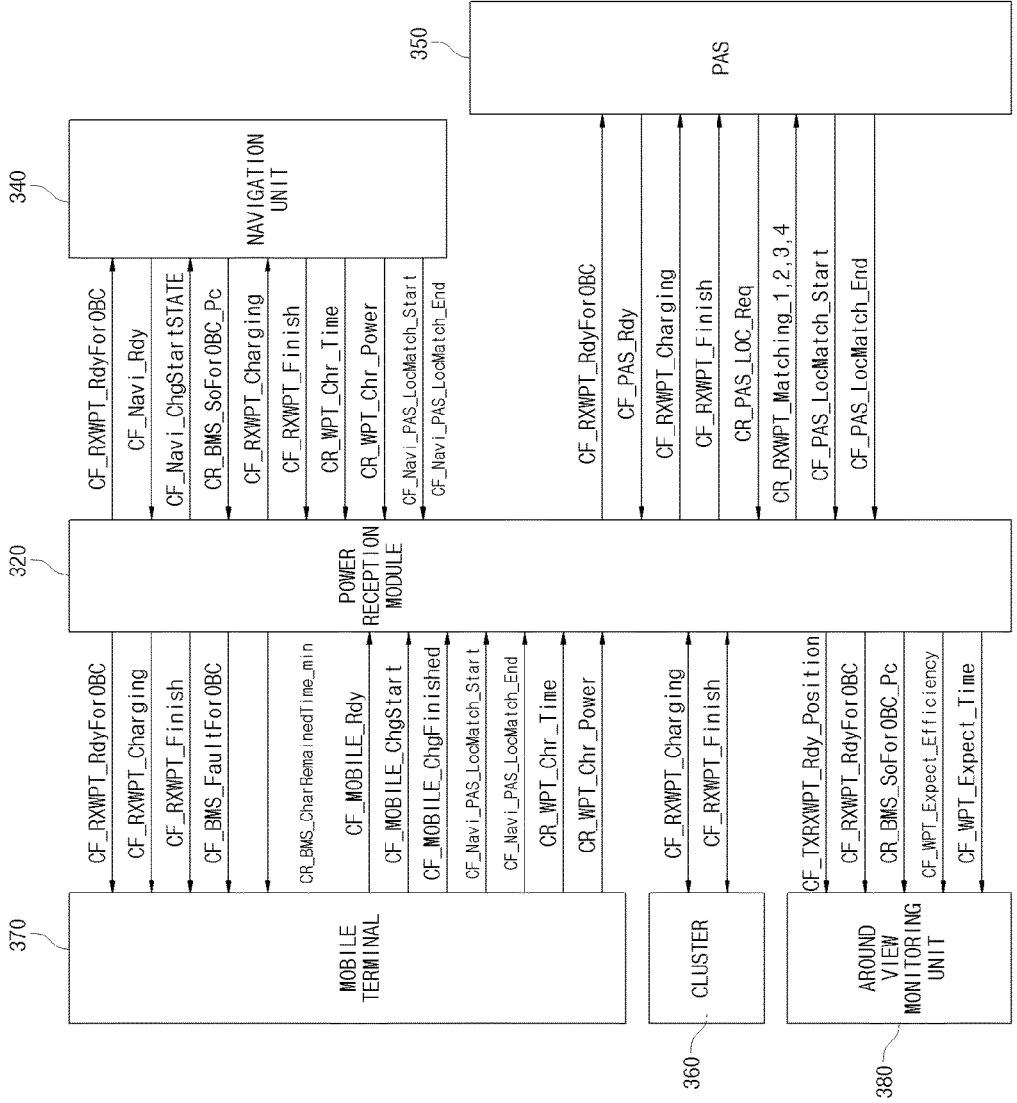
FIG. 6 is a conceptual diagram illustrating a handshaking operation of a power reception module, a mobile terminal, a cluster, an around view monitoring unit, a navigation unit, and a parking assistance system (PAS) according to an embodiment of the present invention.

FIG. 5 is a conceptual diagram for describing a handshaking operation of the power transmission module 100, the power reception module 320, and the BMS 390 according to an embodiment of the present invention, FIG. 6 is a conceptual diagram for describing a handshaking operation of the power reception module 320, the mobile terminal 370, the cluster 360, the around view monitoring unit 380, the navigation unit 340, and the PAS 350 according to an embodiment of the present invention, and the wireless charging guidance system according to an embodiment of the present invention may transceive the data described above shown in [Table 1] to [Table 13] according to the handshaking operation.

Figure 7:
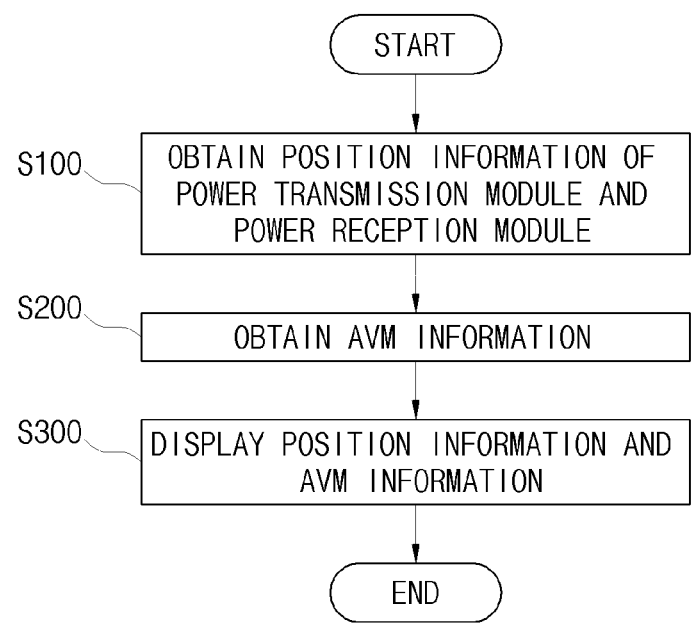
FIG. 7 is a flowchart for describing a vehicle wireless charging guidance method according to an embodiment of the present invention.

FIG. 7 is a flowchart for describing a vehicle wireless charging guidance method according to an embodiment of the present invention.

A vehicle wireless charging guidance method according to an embodiment of the present invention may include obtaining position information of the power transmission module receiving a voltage and switching a transmission coil, and position information of the power reception module receiving energy from the power transmission module (S100), obtaining image information around the vehicle according to the movement of the vehicle and obtaining around view information (S200), and displaying the position information of the power transmission module and the power reception module, and the around view information (S300).

The vehicle wireless charging guidance method may increase the efficiency of the vehicle wireless charging by displaying the position information of the power transmission module and the power reception module together with the around view information, and guiding to allow the user

TABLE 13

| ID | DATA | PERIOD | DATA BYTE | DATA BIT | STATE VALUE | FROM | TO | DESCRIPTION |
|----|------|--------|------|-----|-------|------|----|-------------|
| XX1 | WPT_TX_Position | 100 ms | 0 | 0 | 0~50 cm | RECEPTION MODULE | RECEPTION MODULE | TRANSMISSION UNIT POSITION STATE TRANSMISSION |
| XXF | CF_TXRXWPT_Rdy_Positon | 100 ms | 0 | 0 | 1 | RECEPTION MODULE | AVM | Wireless charging possibility transmission/reception module position state |
|  | CF_TXRXWPT_RdyFcrOBC |  | 1 | 1 |  |  |  | Reception module Ready state (CAN communication inside charger, control board ready) |
|  | CR_BMS_SoForOBC_Pc |  |  | 3 | 5~90% |  |  | Charging amount display |
|  | CF_WPT_Expect_Effciency |  |  | 4 | 0~100% |  |  | Estimated charging efficiency display |
|  | CF_WPT_Expect_Time |  |  | 5 | 0~600, om |  |  | Estimated charging time display |

XX1 is a data classification including position information of the power transmission module, and XXF is a data classification including position information of the power transmission module and the power reception module, and information related to charging amount, estimated charging efficiency and time.

Figure 4:
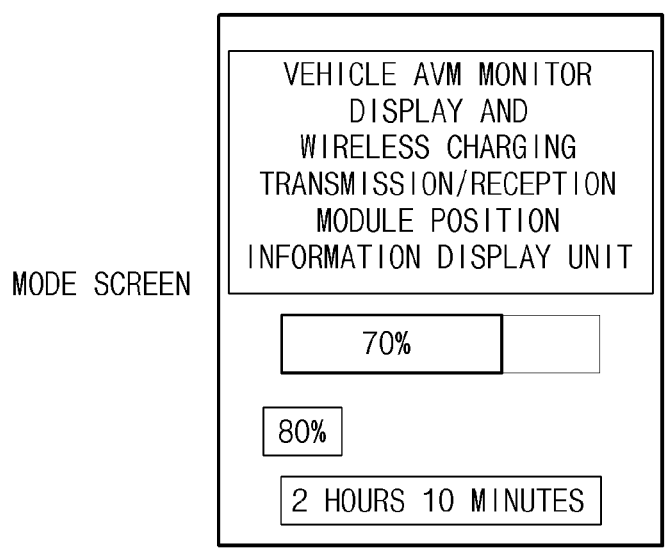
FIG. 4 is a diagram illustrating an example of a screen of an around view monitoring unit according to an embodiment of the present invention.

FIG. 4 is a diagram illustrating an example of a screen of the around view monitoring unit 380 according to an embodiment of the present invention, it may be possible for the user to park the vehicle using display of the around view monitoring unit, and position information of the wireless to park the vehicle so that the positions of the power transmission module and the power reception module are approached. That is, the operation S300 may allow the user to move the vehicle to a position capable of securing the optimum charging efficiency by displaying the position information of the power transmission module and the power reception module together with the around view information with respect to an image around the vehicle.

After the operation S300, the vehicle wireless charging guidance method may further include displaying a completion message when the matching of the power transmission module and the power reception module changed according to the movement of the vehicle is equal to or more than the predetermined value. That is, the user may complete the parking by receiving the completion message when the matching degree of the power transmission module and the power reception module is great.

After the operation S300, the vehicle wireless charging guidance method may further include displaying the battery charging amount information, the estimated charging efficiency information, and the estimated charging time information transmitted from the power reception module. As described above in the description with respect to FIG. 4, it may be possible for the user to find the battery charging amount information, the estimated charging efficiency information, the estimated charging time information transmitted from the power reception module intuitively.

The vehicle wireless charging guidance system and method according to an embodiment of the present invention can increase the wireless charging efficiency of the vehicle by displaying the position information of the power transmission module and the power reception module together with the around view information, and guiding to allow the user to park the vehicle so that the positions of the power transmission module and the power reception module are approached.

The vehicle wireless charging guidance system and method according to an embodiment of the present invention can allow the user to move the vehicle to a position capable of securing the optimum charging efficiency by displaying the position information of the power transmission module and the power reception module together with the around view information with respect to the image around the vehicle.

Further, the vehicle wireless charging guidance system and method according to an embodiment of the present invention may define the interface between the power reception module and the PAS, provide matching position information between the transmission coil of the power transmission module and the reception coil of the power reception module, induce the vehicle movement parking, and thus can increase the charging efficiency.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A vehicle wireless charging guidance system, comprising:
    a power transmission module, which is installed in a charging station and configured to receive a voltage and switch a transmission coil;
    a power reception module, which is installed in a vehicle and configured to switch energy transmitted from the power transmission module so as to correspond to a battery arranged in the vehicle; and
    an around view monitoring unit, which is arranged in the vehicle and configured to receive position information of the power transmission module from the power transmission module and position information of the power reception module from the power reception module, and display the received position information of the power transmission module, the received position information of the power reception module, and image information around the vehicle.

2. The vehicle wireless charging guidance system of claim 1, wherein the power transmission module transmits wireless communication state information, charging state information, the position information of the power transmission module to the power reception module.

3. The vehicle wireless charging guidance system of claim 2, wherein the power reception module transmits the position information of the power transmission module received from the power transmission module and the position information of the power reception module to the around view monitoring unit.

4. The vehicle wireless charging guidance system of claim 3, wherein the around view monitoring unit displays the image information around the vehicle obtained from a camera sensor arranged in the vehicle, and the position information of the power transmission module and the position information of the power reception module, according to movement of the vehicle, and displays a completion message when a matching degree of position of the power transmission module and position of the power reception module is equal to or more than a predetermined value.

5. The vehicle wireless charging guidance system of claim 2, wherein the around view monitoring unit displays charging amount information, estimated charging efficiency information, estimated charging time information of the battery transmitted from the power reception module.

6. The vehicle wireless charging guidance system of claim 1, further comprising:
    a navigation unit configured to display charging state information transmitted from the power reception module, and display a charging power setting tap.

7. The vehicle wireless charging guidance system of claim 1, further comprising:
    a parking assistance system (PAS) configured to move the vehicle so that the power reception module arranged in the vehicle corresponds to the power transmission module using the position information of the power transmission module when a charging command signal is received.

8. A vehicle wireless charging guidance method, comprising:
    (a) obtaining position information of a power transmission module which is installed in a charging station and configured to receive a voltage and switch a transmission coil, and position information of a power reception module, which is installed in a vehicle and configured to receive energy from the power transmission module;
    (b) obtaining image information around the vehicle according to movement of the vehicle, and obtaining around view information; and
    (c) displaying the position information of the power transmission module and the position information of the power reception module, and the around view information.

9. The vehicle wireless charging guidance method of claim 8, after the operation (c), further comprising:
    displaying a completion message when a matching degree of the power transmission module and the power reception module changed according to the movement of the vehicle is equal to or more than a predetermined value.

10. The vehicle wireless charging guidance method of claim 8, after the operation (c), further comprising:
    displaying charging amount information, estimated charging efficiency information, estimated charging time information of the battery transmitted from the power reception module.

* * * * *